United States Patent Office 3,167,525
Patented Jan. 26, 1965

3,167,525
METAL DISPERSIONS IN POLYMERS
John R. Thomas, Lafayette, Calif., assignor to California Research Corporation, San Francisco, Calif., a corporation of Delaware
No Drawing. Filed Mar. 31, 1960, Ser. No. 18,855
14 Claims. (Cl. 260—41)

This invention relates to novel metal dispersions of improved stability and their method of preparation. More particularly, the invention is concerned with a superior new process for preparing stable colloidal dispersions or sols of electropositive metals in nonpolar organic solvents as useful new compositions.

Generally described, colloidal dispersions or sols of metals are prepared by gathering smaller particles, molecules or atoms into particles of colloidal size or by subdividing and dispersing larger particles into smaller particles of colloidal dimensions in a suitable medium. For example, the chemical reduction of a solution of metal salt or the condensation in liquid of metal vapors obtained by passing an arc between electrodes results in the building up of metal atoms or small metal particles into particles of colloidal size. Similarly, mechanical grinding and dispersion of large particles of metals gives smaller particles of colloidal dimensions.

In the above mentioned general methods of preparing metal sols certain dispersants, peptizing agents and protecting colloids are commonly used to provide stability. Such stabilizing materials include, by way of example, metal salts of organic acids such as soaps of fatty acids and metal sulfonates, gums, resins, gelatins, etc. The preparation of stable metal sols of small or fine particle size is a particular problem, even with stabilizing agents of the foregoing types. Such finely divided metal sols are especially useful as contact catalysts for processes where a large amount of surface area is generally necessary. Metal dispersions of small particle size are also important in the production of high energy fuels such as those used as rocket propellants. In such cases high concentrations of fine metal particles in the stable dispersion are desired.

It has now been found that unusually stable dispersions of extremely fine metal particles are prepared by decomposing an organometallic compound of an electropositive metal in which all bonds of said metal are to carbon in a polymeric solution in which the solvent is selected from the class consisting of hydrocarbons and ethers and the polymer is a hydrocarbon or oil soluble macromolecule selected from the group consisting of homopolymers of unsaturated esters having a single polymerizable ethylene group and copolymers of (A) at least one oil-solubilizing monomer having a single polymerizable ethylenic linkage and a monovalent hydrocarbon group of from 4 to 30 aliphatic carbon atoms, and (B) at least one polar monomer, said polymer having a molecular weight of from about 100,000 to about 1,000,000. The dispersions comprise from about 5 to about 99% by weight of solution of polymer and from about 1 to about 95% by weight of metal particles. The polymer is present in the solution in amounts sufficient to suspend the metal particles and prevent them from coagulating.

The fine metal colloidal dispersions prepared in accordance with this invention are remarkably stable over long periods of time. Concentrations of metal particles are obtained which vary from extremely low concentrations up to concentrations approaching those of close-packed spheres. The particles of the dispersions are also extremely fine size and do not agglomerate or coagulate to undesirably large particles or cause breakdown of the dispersion. The metal particles are unusually small, even compared to ordinary colloidal dimensions. The particle sizes range from about 1 to about 100 millimicrons ($m\mu$) as distinguished from the usual colloidal dimensions which ordinarily are not stable below about 400 $m\mu$.

The electropositive metals of the compositions and process of this invention are those having a positive standard oxidation potential when referred to the hydrogen-hydrogen ion couple as zero with unit activities at a temperature of 25° C. Preferably, the electropositive metals have an oxidation potential of not more than 2.40 volts. The table of oxidation potentials of the elements as commonly accepted in the art is given at page 1633 of the "Handbook of Chemistry and Physics," 37th edition, Chemical Rubber Publishing Company, edited by C. D. Hodgman.

The hydrocarbons and ethers used as solvent in the polymeric solution for dispersing the fine metal particles in accordance with this invention are unreactive to the finely divided metal. That is, they do not possess reactive hydrogen atoms. Such reactivity is conveniently expressed in terms of the equilibrium indicated in the equation:

$$RH = R^- + H^+$$

where R is an organic radical. This equation represents the equilibrium of an acid and its ions in an ionizing solvent. The greater the degree of ionization, the stronger the acid; and the equilibrium constant of this reaction is a rough measure of the bond strength of the hydrogen atom in the organic molecule. Suitable liquids for use as dispersing media in this invention are liquids having an acid dissociation constant determined in water systems.

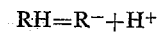

$$K_A = \frac{(H^+)(R^-)}{(HR)}$$

of $10^{-20}$ or less. This definition includes hydrocarbons and simple ethers.

The polymeric solution of the superior new metal dispersions prepared according to this invention contains a hydrocarbon- or oil-soluble polymer which is essentially a macromolecular polyester homopolymer or a copolymer of a hydrocarbon-solubilizing monomer and a polar monomer. The hydrocarbon-solubilizing monomer imparts suitable solubility to the copolymer and the polar monomer has what is commonly termed polarity due to the presence of polar groups such as amino groups, hydroxyl groups, mercapto groups, ether groups, ester groups, polyglycol groups and the like. Copolymers containing such groups have been generally described in recent literature and patents as "polymeric detergents."

For the purposes of the present invention the polymer has been described as a hydrocarbon- or oil-soluble macromolecule selected from the group consisting of homopolymers of unsaturated esters having a single polymerizable ethylene group and copolymers of (A) at least one hydrocarbon-solubilizing monomer having a single polymerizable ethylenic linkage and a monovalent hydrocarbon group of from 4 to 30 aliphatic carbon atoms, and (B) at least one polar monomer, said polymer having a molecular weight of from about 100,000 to about 1,000,000. The term "hydrocarbon- or oil-soluble" is used in its commonly accepted sense and means that the polymer is soluble in oil or liquid hydrocarbon, preferably in amounts of at least about 0.01% by weight.

The unsaturated esters of the abovementioned homopolymers are oleophilic esters of olefinic unsaturation. The oleophilic characteristics are obtained from either the alcohol or the acid portion of the ester, either of which may contain the olefin or ethylene group. The oleophilic alcohol or acid portion of the ester contains from about 4 to about 30 carbon atoms and preferably from about 8 to about 18 carbon atoms. Examples of such oleophilic esters include, methyl methacrylate, butyl methacrylate, dodecyl methacrylate, allyl stearate, etc.

The preferred hydrocarbon-soluble macromolecular polymers for use in the present process and composition consist of copolymers of (A) at least one hydrocarbon-solubilizing monomer having a single ethylenic linkage and containing a monovalent hydrocarbon group of from 4 to 30 aliphatic carbon atoms and (B) at least one polar monomer selected from the group consisting of derivatives of unsaturated aliphatic mono- and dicarboxylic acids of 3 to 6 carbon atoms, including polyalkylene glycol esters of these acids and alkyl ethers thereof, hydroxy and aminoalkyl esters of the aforesaid acids in which the hydroxy and aminoalkyl group contains not more than 8 carbon atoms, hydroxy and amino alkyl amides of similar structure, amides, and finally, unsaturated heterocyclic nitrogen compounds, including vinyl pyridine and the N-vinyl pyrrolidones.

The hydrocarbon or oil-solubilizing (A) monomer of the macromolecular polymeric materials effective as stabilizers for colloidal dispersions (sols) of metals in accordance with the invention can be any compound having at least one ethylenic ($>C=C<$) linkage, at least one monovalent hydrocarbon substituent of from 4 to 30 aliphatic carbon atoms, and which is capable of polymerizing through its ethylenic linkage with the monomer (B) containing a polar group.

The hydrocarbon or oil-solubilizing (A) may be represented by the general formula $R_1(G^1)_n \cdot CH=CH(G)_{n'}R_2$, in which $R_1$ and $R_2$ are members of the group consisting of hydrogen and hydrocarbon radicals of from 4 to 30 carbon atoms, at least one of radicals $R_1$ and $R_2$ containing an aliphatic group of from 4 to 30 carbon atoms; G and $G^1$ are members of the class consisting of oxy (—O—), carbonyl

and carbonyloxy

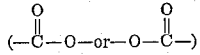

groups and combinations thereof with not more than two alkylene groups of from 1 to 7 carbon atoms each; and $n$ and $n'$ are 0 or 1.

Preferably, the hydrocarbon-solubilizing (A) monomers are higher $C_8$–$C_{30}$ alkyl esters of $\alpha,\beta$-unsaturated $C_3$–$C_6$ aliphatic mono- and dicarboxylic acids. The alkyl portions of these esters may contain from 8 to 30 and preferably from 10 to 20 carbon atoms, while the $C_3$–$C_6$ aliphatic carboxylic acids which may be employed to prepare these alkyl esters may be selected among acids such as acrylic, methacrylic, crotonic, tiglic, angelic, α-ethylacrylic, maleic, α-methylcrotonic, α-ethylcrotonic, β-ethylcrotonic, fumaric and the like.

The unsaturated aliphatic monocarboxylic acids, derivatives of which are included in the group of (B) monomers, may be any of the $C_3$–$C_6$ aliphatic mono- and dicarboxylic acids, e.g., acrylic, methacrylic, tiglic, maleic, itaconic, mesaconic, and the like. The more preferred acids are acrylic and methacrylic.

The polyalkylene glycols and alkyl ethers thereof employed to form the corresponding esters of unsaturated $C_3$–$C_6$ aliphatic mono- and dicarboxylic acids, as suitable monomers of the group (B) for the preparation of the macromolecular copolymer materials, range in molecular weight from about 150 to about 30,000 and preferably from about 200 to 10,000. Polyethylene glycols and their alkyl ethers are preferred. Those of molecular weight in the range from about 400 to about 2,000 are particularly suitable. All of these polyalkylene glycol materials are readily obtainable in accordance with the procedures know in the art.

As indicated hereinbefore, the group of (B) monomers also includes, two particular kinds of nitrogen-containing materials, namely, N-vinyl pyrrolidones and aminoalkyl esters of unsaturated $C_3$–$C_6$ aliphatic mono- and dicarboxylic acids. In these latter, the aminoalkyl group —NR'R" may contain straight-chain or branched-chain alkyl groups, or one alkyl chain and a hydrogen, attached to the nitrogen atom. Suitable N-vinyl pyrrolidones are, for instance, 3-methyl-1-vinyl pyrrolidone, 5-methyl-1-vinyl pyrrolidone, 3,3,5-trimethyl-1-vinyl pyrrolidone, etc.

The macromolecular copolymer materials suitable as stabilizers for metal sols, according to the invention, have apparent molecular weights in the range from about 2,000 to as high as 1,000,000 as determined by the standard light-scattering methods (e.g., one described by D'Alelio in "Fundamental Principles of Polymerization," Wiley and Sons, 1952, pp. 256–267). For practical purposes, molecular weights of from 100,000 to 1,000,000 are most suitable.

Particularly effective as stabilizers for the purposes of the present invention are those macromolecular copolymers in which the ratio of the weight of bound oxygen to the weight of the macromolecule lies between 0.3 and 1.6%.

The preparation of the oil-soluble copolymers operative as stabilizers for the dispersions of metals in liquid hydrocarbons in accordance with the invention, starting from monomers of the types (A) and (B) described hereinabove, is entirely straight-forward and follows the conventional procedures of the art, such as bulk, solution or emulsion polymerizations with the aid of suitable polymerization initiators or catalysts. Preferably the polymerization is effected in an inert organic medium (solvent) such as benzene, in the presence of a free-radical type initiator (in amounts which may range from 0.1 to 10% by weight), for instance, benzoyl peroxide, α,α'-azodiisobutylronitrile, at temperatures which may range from 300° F. to 350° F.

One embodiment of such polymerization is illustrated below by an example in which dodecyl methacrylate as monomer (A) and dodecyl ether-capped polyethylene glycol (mol. wt. 1600 average) methacrylate as monomer (B) were employed to prepare the macromolecular copolymer suitable as a stabilizer for metal sols in accordance with the invention.

Into a 500 cc. three necked flask, equipped with a mechanical stirrer, a reflux condenser, and a burette, there was charged 106 g. of dodecyl methacrylate (0.418 mol), 14 g. of dodecyl ether-capped polyethylene glycol methacrylate (0.0075 mol), and 213 g. of benzene, together with 0.01% by weight of α,α'-azodiisobutyronitrile as a catalyst. The polymerization was carried out at reflux, after sweeping out the whole system with nitrogen. The reaction temperature was held at 190° F., and the catalyst was added in increments every 15 minutes to maintain a constant catalyst level. After 7½ hours the conversion was equal to 86%. The product had an alkyl to dodecyl ether-capped polyethylene glycol methacrylate ratio of 88 to 1. The average molecular weight of the product was approximately 280,000.

As previously mentioned, the oil-soluble macromolecular copolymer is employed in the polymeric solution in amounts sufficient to suspend the metal particles and prevent them from coagulating. Preferably, from about 0.01 to about 10.0% by weight based on the solvent of the polymer is present for this purpose.

The solvent of the dispersions according to the invention has been previously described in general terms. Typical hydrocarbon solvents are benzene, n-pentane, hexane, cyclohexane, isooctane, as well as mixtures of hydrocarbons such as those normally present in gasoline, white oil, lubricating oil, kerosene, fuel oil, etc. The simple ethers suitably used as solvents include dimethyl ether, diethyl ether, methylethyl ether, n-butylethyl ether and the like.

In the preparation of the dispersions according to the process of the invention the organometallic compounds are decomposed in the polymeric solution. Suitable methods for decomposing the organometallic compounds include thermal and photochemical treatments. Thermally, the organometallic compounds are dispersed in the polymer solution which is heated to the desired temperature to decompose the compound and give the dispersion of fine metal particles. Photochemically, the polymeric solution containing organometallic compound is subjected to radiation from either ultraviolet or visible light sources to decompose the organometallic compound. Combinations of thermal and photochemical treatments may be employed.

The term organometallic compound as used herein refers to substances containing metal to carbon bonds but excluding metal carbides. Such compounds contain only the elements carbon, hydrogen and oxygen in addition to the metal. Included are all metallic compounds of hydrocarbons, metal carbonyls and complex metal hydrocarbon carbonyls. Metal derivatives of hydrocarbons containing additional nonhydrocarbon constituents are excluded. As mentioned earlier, the metal must have a positive standard oxidation potential of not more than 2.40 volts referred to the hydrogen-hydrogen ion couple. These metals include, among others, magnesium, aluminum, beryllium, titanium, manganese, zinc, chromium, iron, cadmium, cobalt, nickel, molybdenum, tin and lead. Examples of suitable organometallic derivatives are diphenyl magnesium, diphenyl beryllium, triisobutyl aluminum, biscyclopentadienyl titanium, biscyclopentadienyl manganese, diethyl zinc, biscyclopentadienyl chromium, iron tetracarbonyl, dipropyl cadmium, cobalt tetracarbonyl, nickel tetracarbonyl, molybdenum hexacarbonyl, tetraallyl tin, and tetrapropyl lead.

The compositions and process acocrding to the invention as described above are further illustrated by the following examples. In these examples the proportions are on a weight basis unless otherwise specified.

EXAMPLE I

Preparation of lead sols

Three hundred milligrams of tetraethyl lead was dissolved in 100 cc. of isooctane containing 0.3% copolymer of doecyl methacrylate and N-vinyl pyrrolidone. When aliquots of this solution were exposed to high intensity ultraviolet irradiation in the absence of oxygen, a stable lead colloid was produced. In one case the light source consisted of a xenon-filled flash lamp. This lamp is operated by discharging through it an 80 microfarad condenser charged to 4000 volts. In another case the tetraethyl lead was decomposed by using a high pressure, air cooled mercury arc operating at 60 cycles per second. The decomposition could be affected in either Pyrex or quartz containers. In one case, by stripping off the isooctane under vacuum the concentration of the lead sol was increased to 10 weight percent. At this concentration the sol remained stable for three months with no apparent change. Electron microscope examination demonstrated that the lead particles were the order of 50 A. in diameter, and X-ray diffraction investigations proved the metallic nature of the particles.

The technique of photochemical decomposition to produce metallic sols will work with any of the various hydrocarbon soluble metal compounds which absorb light in the ultraviolet or visible portion of the spectrum and which decompose as a result of the absorption to give the free metal atom.

EXAMPLE II

Preparation of zinc sols

Using dilute solutions of zinc diethyl in isooctane containing 0.5% copolymer of dodecyl methacrylate and N-vinyl pyrrolidone and irradiating the sample in the same manner as described above, it was possible to produce a stable colloid of zinc. Both the lead and the zinc sols reacted rapidly with oxygen and water, presumably to give either the oxide or the hydroxides.

EXAMPLE III

Preparation of nickel sols

Two hundred milligrams of nickel carbonyl was dissolved in 100 cc. of isooctane containing 0.5% copolymer of dodecyl methacrylate and N-vinyl pyrrolidone as described above. When exposed to ultraviolet radiation as described above, a metallic nickel sol was produced. Solution of this sol exhibited a strong ferromagnetic resonance when studied in the electron paramagnetic resonance spectrometer. It showed a $g$ value of about 2.2 and a line width of about 500 gauss. This characteristic ferromagnetic resonance spectrum for very small nickel particles was reported by D. M. S. Gagguley, Proc. Roy. Soc. 228, 549 (1955), and demonstrates the metallic nature of the nickel particles. This sample was evaporated to dryness under nitrogen, and the residue was dissolved in 5 cc. of methyl methacrylate. By use of a few milligrams of azo-bis-isobutyronitrile, the polymethyl methacrylate was polymerized to give a solid block of plastic. The nickel sol, protected by the copolymer of dodecyl methacrylate and N-vinyl pyrrolidone as described above, dissolved uniformly and completely in the methyl methacrylate. The polymerized plastic contained the nickel sol in dispersed form. Ths nickel-containing plastic material exhibited magnetic properties when tested with a permanent magnet.

Because nickel carbonyl can be decomposed to yield nickel metal at about 60° C., it is clear that a nickel sol can be prepared by thermal decomposition in the same way that the iron sol was prepared, as described below.

EXAMPLE IV

Preparation of iron sols

Fifty milligrams of iron carbonyl was dissolved in 10 cc. of isooctane containing 0.5% copolymer of dodecyl methacrylate and N-vinyl pyrrolidone, then heated at 170° C. in the absence of oxygen, the iron carbonyl decomposed to yield a stable iron sol. This sol was also dispersed in methyl methacrylate, as described above, and cast in a solid block of plastic. This sample also showed magnetic response to a permanent magnet. The foregoing preparation was repeated with toluene and benzene as solvents to give similar dispersions.

EXAMPLE V

Preparation of molybdenum sols

Photodecomposition of molybdenum carbonyl dissolved in a detergent-containing solution as described above gave a molybdenum sol.

In the above examples the copolymer of dodecyl methacrylate and N-vinyl pyrrolidone is a typical macromolecular detergent copolymer having a molecular weight of about 550,000 and a mole ratio of dodecyl methacrylate to N-vinyl pyrrolidone of about 5 to 1.

Still other examples of useful new metal dispersions in accordance with the present invention are given in the following table:

are protected against agglomeration by a surrounding layer of protective polymer. This is not a film impervious to the movement of small molecules as is illustrated

TABLE

| Example No. | Metal | Metal Compound | Detergent Copolymer | Solvent | Decomposition |
|---|---|---|---|---|---|
| VI | Magnesium | Diphenyl magnesium | (1) | Diamyl ether | Heating. |
| VII | Tin | Tetraallyl tin | (2) | Petroleum naphtha | Ultraviolet light. |
| VIII | Beryllium | Diphenyl beryllium | (3) | Methyloctyl ether | Actinic light. |
| IX | Molybdenum | Molybdenum hexacarbonyl | (2) | Diisopropyl ether | Do. |
| X | Aluminum | Trioctyl aluminum | (5) | Hexadecane | Heating. |
| XI | Nickel | Nickel tetracarbonyl | (3) | Propylene tetramer | Do. |
| XII | Titanium | Biscyclopentadienyl titanium | (1) | Eicosane | Ultraviolet light. |
| XIII | Cobalt | Cobalt tetracarbonyl | (4) | Isooctane | Do. |
| XIV | Iron | Iron tetracarbonyl | (5) | Octadecane | Heating. |
| XV | Chromium | Biscyclopentadienyl chromium | (2) | Butyl ethyl ether | Actinic light. |
| XVI | Zinc | Diethyl zinc | (3) | Toluene | Ultraviolet light. |
| XVII | Cadmium | Dipropyl cadmium | (4) | Isooctane | Do. |
| XVIII | Iron | Iron carbonyl | (6) | Benzene | Heating. |

In the above examples a variety of metal compounds, detergent copolymers, solvents and methods of decompositions are shown. Detergent copolymer (1) is the copolymer of dodecyl methacrylate, methacrylic acid and decaethylene glycol octadecyl ether methacrylate (mol ratio 7.3/0.8/0.2); detergent copolymer (2) is the copolymer of "Oxo"-tridecyl methacrylate octadecyl methacrylate and decaethylene glycol tridecyl ether methacrylate (mol ratio 10.2/6.8/1.0); copolymer (3) is the copolymer of dodecyl methacrylate and diethyl aminoethyl methacrylate; copolymer (4) is the copolymer of dodecyl methacrylate and methacrylic acid (mol ratio 7/1); copolymer (5) is the copolymer of 1-hexene and acrylonitrile (mol ratio 12:1); and copolymer (6) is the homopolymer of methylmethacrylate (approximate molecular weight 150,000).

The finely divided dispersions of metals of the present invention, as illustrated by the above examples, are useful in a variety of applications. The dispersion may be used as first formed in the unreactive organic liquid solvent, or the dispersions may be concentrated by evaporation of part of the liquid. The liquid may be completely separated from the dispersed particles which remain as a very fine powder protected from aggregation by the polymeric material used in the preparation. This powder may be dispersed in the same or a different liquid. For example, the powder may be dispersed in an organic monomer capable of polymerization by an initiator or by other means. This polymerization causes the metal to be dispersed in a solid plastic. Examples of such plastics include polymethylmethacrylate, polystyrene, and esterstyrene copolymers.

The preparation of single-domain magnets is a particularly useful embodiment of this invention. Such magnets are made up of particles of ferromagnetic materials, the particles having diameters below a certain critical value which varies with each metal. Iron, cobalt, nickel and alloys of these metals are particularly useful for the construction of such magnets. For iron the particles should not be larger than about 150 A. in order to have single-domain properties. The small ferromagnetic particles may be dispersed in various media for different types of magnets including liquids of different viscosities and solid plastics. Thus, in line with this invention, a stable dispersion of a ferromagnetic metal may be prepared in a low boiling hydrocarbon or ether, and the hydrocarbon or ether may then be removed by evaporation, leaving the finely particulate metal in a condition in which it can be readily dispersed in another liquid. By using a liquid capable of polymerization to a plastic, a solid magnet can be produced having any desired magnetic induction within wide limits. The polymerization to form a solid plastic may be carried out in a magnetic field in order to orient the single-domain magnetic particles.

As was mentioned above, the small metallic particles by the extreme reactivity of these finely dispersed metal particles to oxygen or water. On admission of air or water to dispersions of the metals, there is a rapid change in color of the dispersion from the characteristic black color of the finely divided metal particles. These metal dispersions are thus very useful as catalysts such as hydrogenation catalysts.

The use of finely dispersed metals prepared according to this invention for high energy fuels such as rocket fuels has already been mentioned. Useful metals for these purposes include magnesium, aluminum, beryllium and boron.

Because of the extreme chemical reactivity of these finely divided metal dispersions oxides, hydroxides, halides and other compounds are readily prepared. These compounds are also stabilized in the dispersed state and exist as very stable sols with little tendency toward agglomeration. Many of these compounds are useful as catalysts, pigments, or for other purposes.

Uses of individual dispersed metals in the form of sols in accordance with the present invention listed in the following table include:

Magnesium—Rocket fuel.
Aluminum—Rocket fuel.
Beryllium—Rocket fuel.
Titanium—Conversion to the oxide, useful as a pigment.
Manganese—Catalyst. Conversion to the oxide or halide, useful as catalysts.
Zinc—Conversion to halides, useful as catalysts.
Chromium—Catalyst. Conversion to the oxide, useful as a catalyst.
Iron—Magnet, catalyst.
Cadmium—Conversion to the sulfide, useful as a pigment.
Cobalt—Magnet, catalyst.
Nickel—Magnet, catalyst.
Molybdenum—Catalyst. Conversion to the oxide, useful as a catalyst.
Tin—Conversion to the halide, useful as a catalyst.
Lead—Conversion to the oxide, useful as a lubricant additive.

I claim:
1. A method of preparing a composition of a stable dispersion of metal particles of less than 400 millimicrons in diameter, wherein the metal is a member of the group consisting of magnesium, aluminum, beryllium, titanium, manganese, zinc, chromium, cadmium, molybdenum, and lead and is present in an amount of from 5 to 99% by weight of said composition; the remainder of the composition being polymer in at least an amount sufficient to suspend the metal particles and prevent them from coagulating, and selected from the group consisting of:
homopolymers of polymerizable monoethylenic unsatu- rated esters of from 4 to 30 carbons, wherein said esters are of the following formula:

$$CH_2=CH(G)R_2$$

wherein G is

and $R_2$ is hydrocarbyl;
copolymers of said polymerizable monoethylenic unsaturated esters and a polar monomer selected from the group consisting of polyalkylene glycol esters of from 400 to 2000 molecular weight of unsaturated aliphatic carboxylic acids of from 3 to 6 carbons, N-vinyl pyrrolidones, amino alkyl esters of aliphatic unsaturated carboxylic acids of from 3 to 6 carbons, hydroxy alkyl esters of unsaturated aliphatic carboxylic acids of from 3 to 6 carbons and amides of unsaturated aliphatic monocarboxylic acids of 3 to 6 carbons; wherein said polymer is of molecular weight of from 2,000 to 1,000,000; and a nonpolar solvent selected from the group consisting of hydrocarbons and ethers;
which comprises photochemically decomposing in the absence of oxygen an organo-metallic compound of said metal selected from the group consisting of metal carbonyls, complex metal hydrocarbon carbonyls and metal hydrocarbyls in which all bonds of said metal are to carbon, in a solution of said polymer and said solvent to yield a stable dispersion.

2. A method of preparing a composition of a stable dispersion of metal particles of less than 400 millimicrons in diameter, wherein the metal is a member of the group consisting of magnesium, aluminum, beryllium, titanium, manganese, zinc, chromium, cadmium, molybdenum, and lead and is present in an amount of from 5 to 99% by weight of said composition; the remainder of the composition being polymer in at least an amount sufficient to suspend the metal particles and prevent them from coagulating, and selected from the group consisting of:
homopolymers of polymerizable monoethylenic unsaturated esters of from 4 to 30 carbons, wherein said esters are of the following formula:

$$CH_2=CH(G)R_2$$

wherein G is

and $R_2$ is hydrocarbyl;
copolymers of said polymerizable monoethylenic unsaturated esters and a polar monomer selected from the group consisting of polyalkylene glycol esters of from 400 to 2000 molecular weight of unsaturated aliphatic carboxylic acids of from 3 to 6 carbons, N-vinyl pyrrolidones, amino alkyl esters of aliphatic unsaturated carboxylic acids of from 3 to 6 carbons, hydroxy alkyl esters of unsaturated aliphatic carboxylic acids of from 3 to 6 carbons and amides of unsaturated aliphatic monocarboxylic acids of 3 to 6 carbons; wherein said polymer is of molecular weight of from 2,000 to 1,0000,000; and a nonpolar solvent selected from the group consisting of hydrocarbons and ethers;
which comprises thermally decomposing in the absence of oxygen an organo-metallic compound of said metal selected from the group consisting of metal carbonyls, complex metal hydrocarbon carbonyls and metal hydrocarbyls in which all bonds of said metal are to carbon, in a solution of said polymer and said solvent to yield a stable dispersion.

3. A method according to claim 2 wherein the polymer is of molecular weight 100,000 to 1,000,000.

4. A method according to claim 2 wherein said polymer is composed of acrylic esters.

5. A method according to claim 2 wherein said polymer is composed of methacrylic esters.

6. A method according to claim 2 wherein said polymer is a copolymer of acrylic esters and N-vinyl pyrrolidones.

7. A method according to claim 2 wherein the method of decomposition is thermal.

8. A method of preparing a composition of a stable dispersion of lead particles of less than 400 millimicrons in diameter, wherein said metal is present in an amount of from 5 to 99% by weight of said composition, the remainder of the composition being a copolymer of dodecyl methacrylate and N-pyrrolidone, said polymer being present in an amount sufficient to suspend the metal particles and prevent them from coagulating, and a hydrocarbon solvent, which comprises photolytically decomposing lead hydrocarbyl in the absence of oxygen in a solution of said polymer and said solvent to yield a stable dispersion.

9. A composition of matter as prepared in claim 2.
10. A composition of matter as prepared in claim 3.
11. A composition of matter as prepared in claim 4.
12. A composition of matter as prepared in claim 5.
13. A composition of matter as prepared in claim 6.
14. A composition of matter as prepared in claim 8.

References Cited in the file of this patent

UNITED STATES PATENTS

| | | |
|---|---|---|
| 1,805,199 | Alleman | May 12, 1931 |
| 2,013,152 | Hoyt | Sept. 3, 1935 |
| 2,635,041 | Hansley et al. | Apr. 14, 1953 |
| 2,651,105 | Neel | Sept. 8, 1953 |
| 2,728,751 | Catlin et al. | Dec. 27, 1955 |
| 2,927,849 | Greblick et al. | Mar. 8, 1960 |
| 2,947,646 | Devaney et al. | Aug. 2, 1960 |
| 2,974,104 | Paine et al. | Mar. 7, 1961 |
| 2,989,415 | Horton et al. | June 20, 1961 |
| 3,014,818 | Campbell | Dec. 26, 1961 |

FOREIGN PATENTS

| | | |
|---|---|---|
| 616,839 | Great Britain | Jan. 27, 1949 |

OTHER REFERENCES

Paine et al.: Fine-Particle Magnets, Electrical Engineering, vol. 76, October 1957, pp. 851–857.

Horn: Acrylic Resins, Reinhold Publishing Corp., 1960.

Smith: Vinyl Resins, Reinhold Publishing Corp., 1958.

Zaehringer: Missiles and Rockets, vol. 5, No. 7, Feb. 16, 1959, page 33.